No. 864,266. PATENTED AUG. 27, 1907.
B. A. SAHLMANN & L. S. CAPLE.
EDGE LAWN TRIMMER.
APPLICATION FILED SEPT. 17, 1906.
2 SHEETS—SHEET 1.
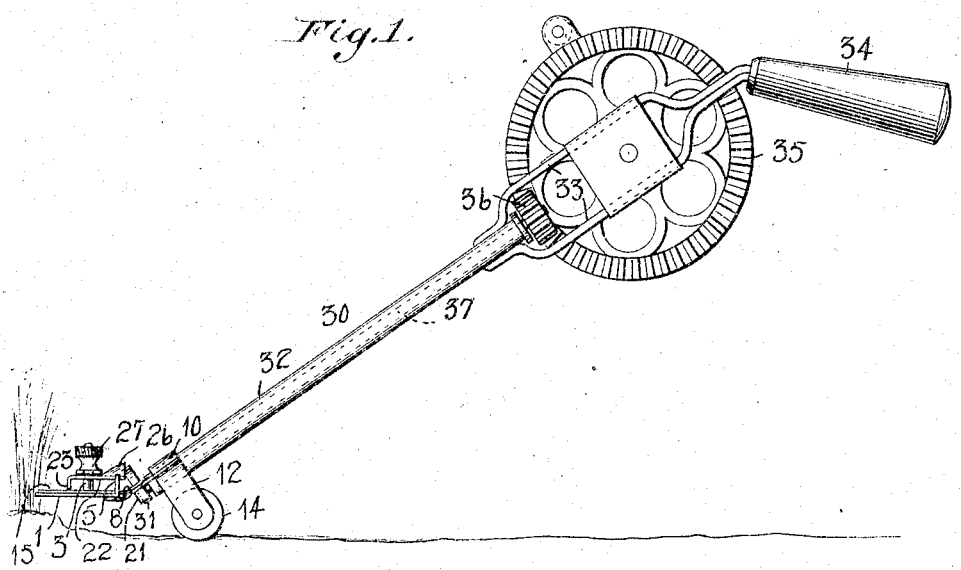
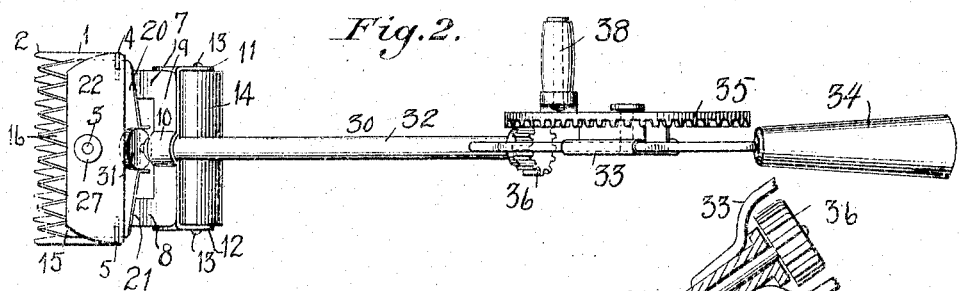
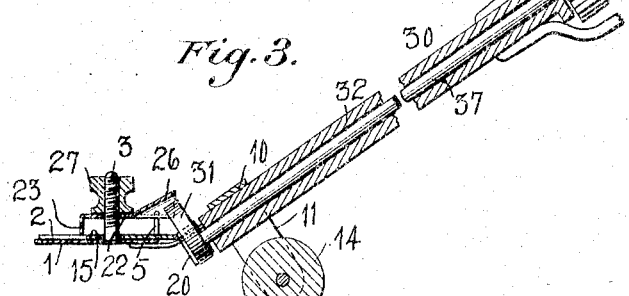
Witnesses:
Inventors:

No. 864,266.
PATENTED AUG. 27, 1907.
B. A. SAHLMANN & L. S. CAPLE.
EDGE LAWN TRIMMER.
APPLICATION FILED SEPT. 17, 1906.
2 SHEETS—SHEET 2.
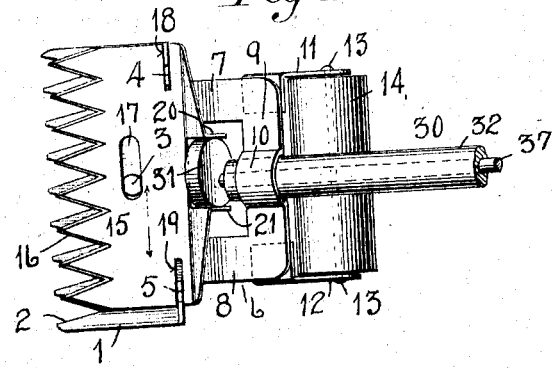
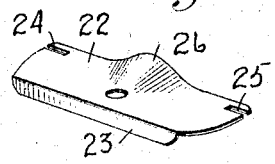
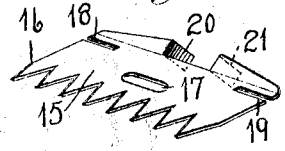
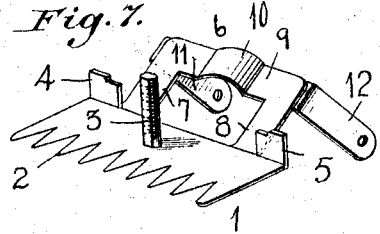
Witnesses:
Peter J. Smith
Alfred B. Day
Inventors:
Bengt August Sahlmann
Lillian Shannon Caple

UNITED STATES PATENT OFFICE.

BENGT AUGUST SAHLMANN AND LILLIAN SHANNON CAPLE, OF BOISE, IDAHO.

EDGE LAWN-TRIMMER.

No. 864,266.          Specification of Letters Patent.        Patented Aug. 27, 1907.

Application filed September 17, 1906. Serial No. 335,045.

*To all whom it may concern:*

Be it known that we, BENGT AUGUST SAHLMANN and LILLIAN SHANNON CAPLE, of Boise city, in the county of Ada, in the State of Idaho, have invented certain new and useful Improvements in Trimmers for the Edges of Lawns, of which the following is a specification.

This invention relates to an improved lawn edge trimmer.

The object of the invention is to provide a grass cutter or trimmer which is adapted to trim the edges and cut close to a fence, trees, or buildings, and which is simple in construction and efficient in operation.

In the accompanying drawings, Figure 1 represents a side elevation of this improved trimmer; Fig. 2 represents a top plan view thereof; Fig. 3 represents a longitudinal vertical section thereof; Fig. 4 represents an enlarged top plan view of the cutting blades, with the top plate removed; Fig. 5 represents a perspective view of the top guard plate detached; Fig. 6 represents a similar view of the top cutting blade detached; and Fig 7 represents a similar view of the bottom cutting blade.

In the embodiment illustrated, a lower stationary cutting plate or blade, 1, is shown having teeth, as 2, an upwardly projecting screw-threaded stud 3 arranged thereon, preferably about the center thereof, and which is provided with upwardly projecting lugs, or tongues, 4 and 5, on its rear edge at its opposite ends for a purpose hereinafter described. Extending from the rear edge of this plate, 1, is a bracket, 6, consisting of two spaced arms, 7 and 8, secured to or made integral with said blade at one end and connected at their other ends by a cross-bar, 9, having a curved or bow-shaped central portion, 10, to fit over and form a bearing for the handle, 30, hereinafter described. Depending from the opposite ends of this cross-bar are two arms, 11 and 12, having apertures in their lower ends to receive the axle ends, as 13, of a supporting roller, or wheel, 14. The upper part of this cutter comprises a blade, 15, having cutting teeth, as 16, to coöperate with the teeth of the lower blade. This blade, 15, has a longitudinal slot, 17, to fit over and slide on the stud, 3, of the lower blade, 1, and is provided at its opposite ends adjacent its rear edge with slots, 18 and 19, which slide on the lugs, or tongues, 4 and 5. This blade, 15, is also provided at its rear edge with spaced depending arms, 20 and 21, between which an eccentric, 31, mounted in the handle, 30, is disposed and adapted to turn.

Mounted on the stud, 3, over the top cutting blade is a plate 22, having a down-turned front flange, 23, which bears on the blade, 15, near its teeth and holds it in operative position. This guard plate, 22, has end slots, 24 and 25, which fit over the lugs, 4 and 5, above the top cutter blade, 15, and is provided with an upbent central portion, 26, forming a protecting front hood for the eccentric, 31. This guard plate is held in position on the blades by means of a nut, 27, on the stud, 3.

The handle, 30, preferably comprises a tubular member, 32, mounted at one end in the bracket of the lower cutting blade and having connected at its other or outer end a loop-shaped supporting bracket, 33, with a hand grip, 34, at its outer end.

Mounted on a stud in this bracket or frame, 33, is a crown gear, 35, which meshes with the pinion, 36, on the outer end of a rod or spindle, 37, loosely disposed in the tubular member, 32, and extending therethrough. At the lower end of the spindle, 37, is fixed the eccentric, 31, which is disposed between the arms, 20 and 21, of the slotted upper blade, 15, and which, when rotated, reciprocates said blade, 15, longitudinally on the blade, 1, and acts as a clipper to cut the grass. On the crown gear, 35, is secured a crank handle, 38, for turning said gear to operate the cutting blades.

In the operation of this device the trimmer is moved forward to the edge to be trimmed and the crank handle, 38, is turned to rotate the crown gear, 35, and through the pinion, 36, with which it meshes, the rod, 37, having secured to its lower end the eccentric, 31. The rotation of this eccentric, 31, causes the blade, 15, to be reciprocated on the fixed lower blade, 1, whereby the lawn may be trimmed closely to a fence or other object.

We claim as our invention,—

1. A lawn edge trimmer comprising a lower toothed cutting blade, a screw-threaded stud projecting upwardly therefrom, upwardly-extending lugs arranged at opposite ends of the rear edge thereof, a bracket secured to the rear edge of said blade, an upper cutting blade or sickle having end slots engaged with said lugs and a longitudinal slot through which said stud projects, spaced members at the rear of said sickle blade, a handle mounted in said bracket and having a cam arranged to operate between said spaced members, a roller mounted on said bracket, and means for rotating said cam to reciprocate said top blade.

2. A lawn edge trimmer comprising a lower toothed cutting blade, a screw-threaded stud projecting upwardly therefrom, upwardly-extending lugs arranged at opposite ends at the rear edge thereof, a bracket secured to the rear edge of said blade, a roller mounted in said bracket, an upper cutting blade or sickle bar having end slots engaging said lugs and a longitudinal slot through which said stud projects, spaced members at the rear of said sickle blade, a handle mounted in said bracket and having a cam arranged to operate between said spaced members, a guard plate mounted on said stud and arranged over the upper cutting blade and having a depending flange bearing on said upper blade, a nut on said screw-threaded stud to hold said parts in engagement, and means carried by said handle for rotating said cam to reciprocate said top blade.

BENGT AUGUST SAHLMANN.
LILLIAN SHANNON CAPLE.

Witnesses:
EDWARD B. TOLL,
WILLIAM G. MESSERSMITH.